(12) United States Patent
Yamamoto et al.

(10) Patent No.: US 6,601,984 B2
(45) Date of Patent: Aug. 5, 2003

(54) LED ILLUMINATING DEVICE AND LIGHTING APPARATUS EMPLOYING THE SAME

(75) Inventors: Yutaka Yamamoto, Kasakakemachi (JP); Atsushi Yuzuki, Kasakakemachi (JP); Kazuaki Saito, Kasakakemachi (JP)

(73) Assignee: Estec Co., Ltd., Gunma (JP)

( * ) Notice: Subject to any disclaimer, the term of this patent is extended or adjusted under 35 U.S.C. 154(b) by 0 days.

(21) Appl. No.: 10/073,038

(22) Filed: Feb. 12, 2002

(65) Prior Publication Data

US 2002/0131275 A1 Sep. 19, 2002

(30) Foreign Application Priority Data

| Feb. 14, 2001 | (JP) | ................................. 2001-037281 |
| Feb. 23, 2001 | (JP) | ................................. 2001-049099 |
| May 22, 2001 | (JP) | ................................. 2001-152478 |
| Jan. 16, 2002 | (JP) | ................................. 2001-000148 |

(51) Int. Cl.[7] ................................................. F21V 8/00
(52) U.S. Cl. ..................... 362/555; 362/555; 362/559; 362/812
(58) Field of Search .................... 362/31, 812, 555, 362/559, 183

(56) References Cited

U.S. PATENT DOCUMENTS

| 5,664,862 | A | * | 9/1997 | Redmond et al. ............. 362/31 |
| 6,367,941 | B2 | * | 4/2002 | Lea et al. .................... 362/31 |
| 6,461,007 | B1 | * | 10/2002 | Akaoka ....................... 362/31 |
| 2002/0034071 | A1 | * | 3/2002 | Mabuchi ...................... 362/31 |
| 2002/0141201 | A1 | * | 10/2002 | Shimura et al. ............. 362/31 |

FOREIGN PATENT DOCUMENTS

| WO | WO98/13709 | 4/1998 |

* cited by examiner

*Primary Examiner*—Laura K. Tso
(74) *Attorney, Agent, or Firm*—Lowe Hauptman Gilman & Berner, LLP

(57) ABSTRACT

An LED illuminating device that includes a light-guiding member formed of a translucent material; an LED element formed of at least one diode disposed on one end of the light-guiding member for emitting light therein; a light-emitting region along the length of the light-guiding member; and a plurality of grooves having a rectangular cross-section and formed in the circumferential surface of the light-guiding member at appropriate intervals in the axial direction. The present invention also provides an LED illuminating appliance of various configurations that employ the LED illuminating device as a light source.

15 Claims, 7 Drawing Sheets

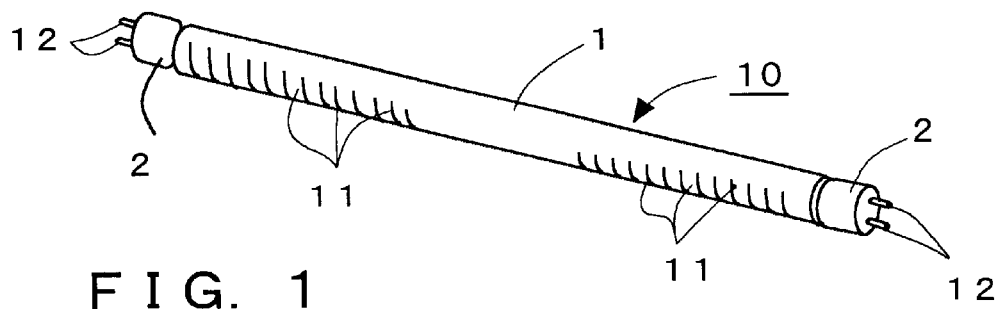
F I G. 1
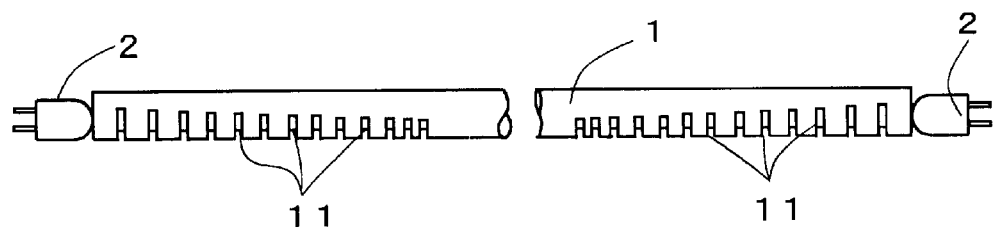
F I G. 2
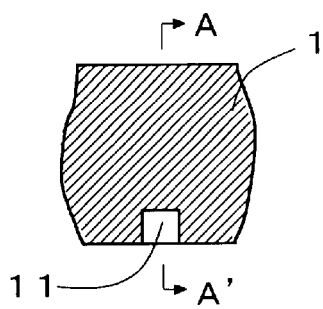 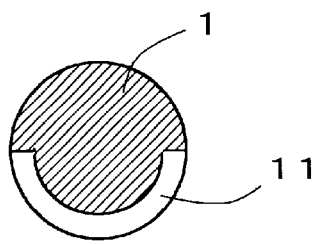
F I G. 3 (A)    F I G. 3 (B)
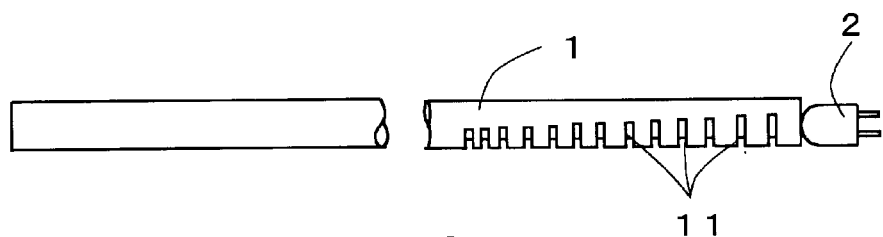
F I G. 4

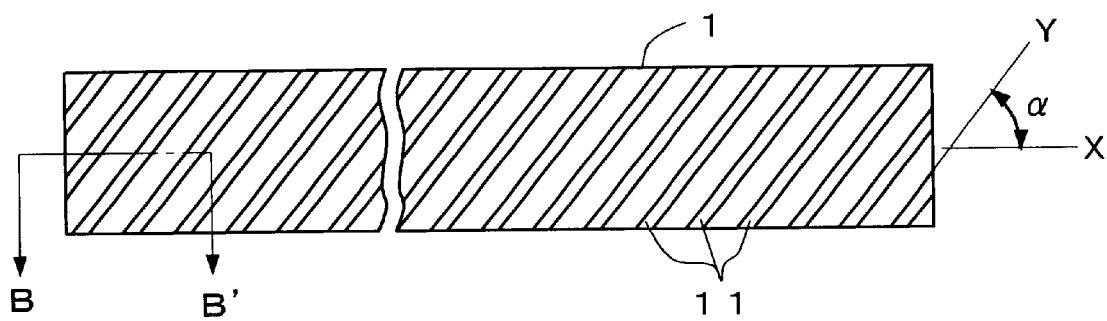
F I G. 5 (A)
F I G. 5 (B)
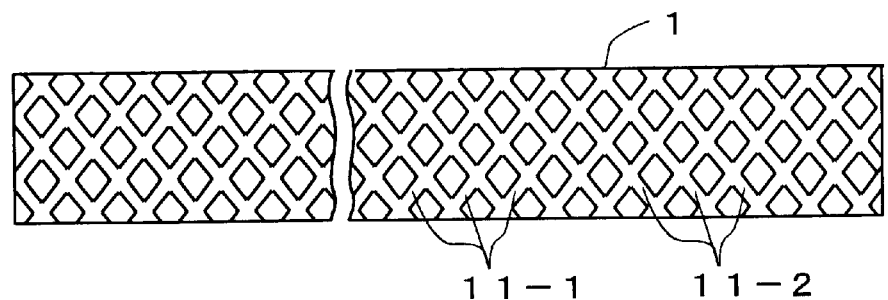
F I G. 6

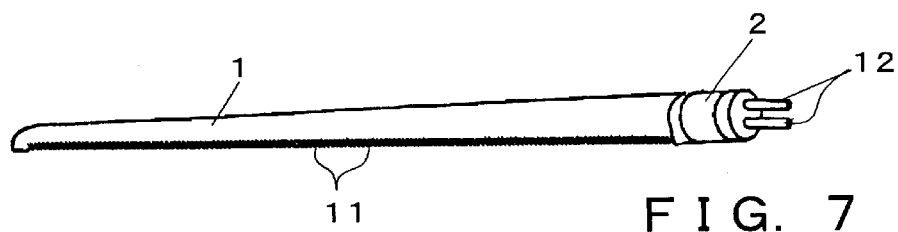
FIG. 7
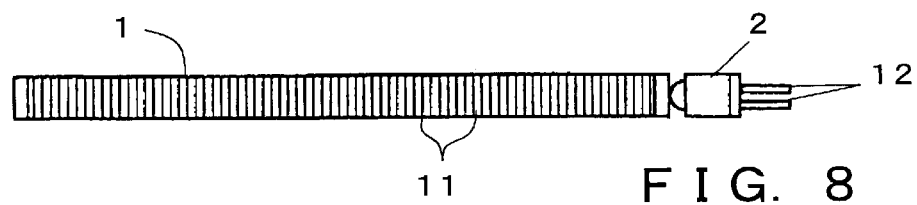
FIG. 8
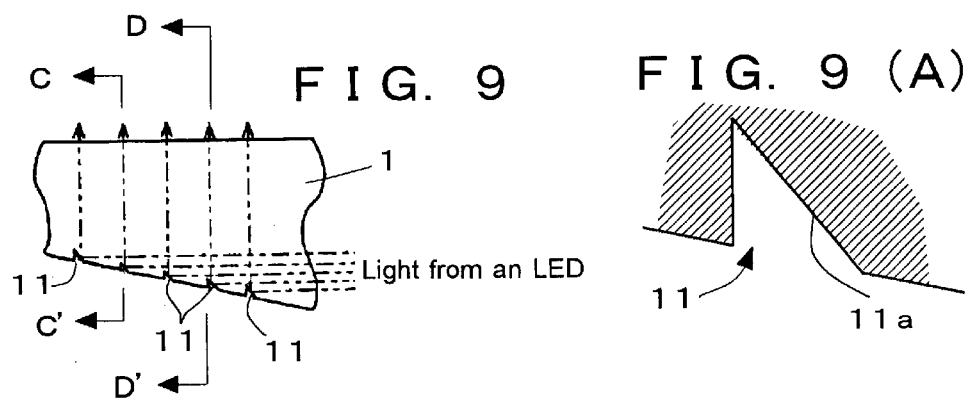
FIG. 9
FIG. 9 (A)
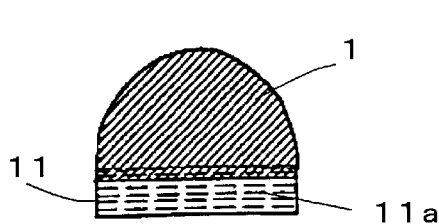
FIG. 9 (B)
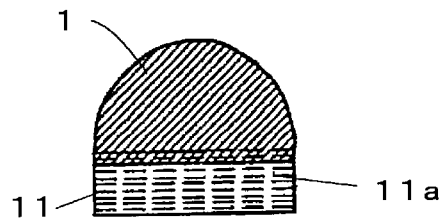
FIG. 9 (C)
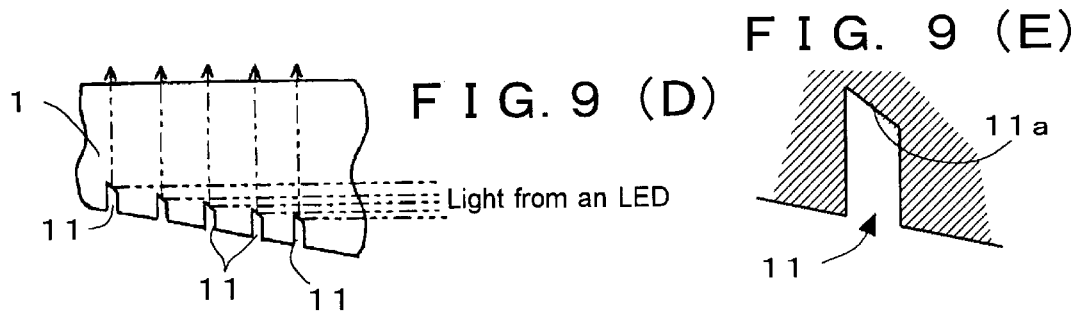
FIG. 9 (D)
FIG. 9 (E)

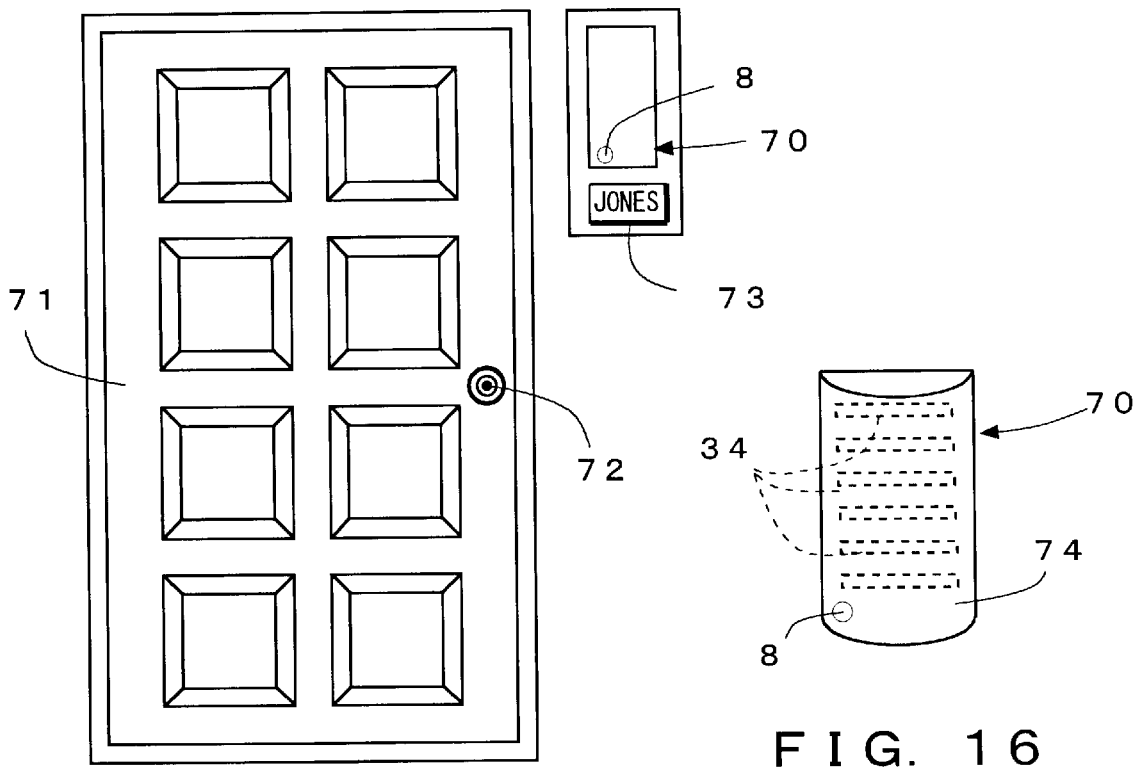
FIG. 15
FIG. 16
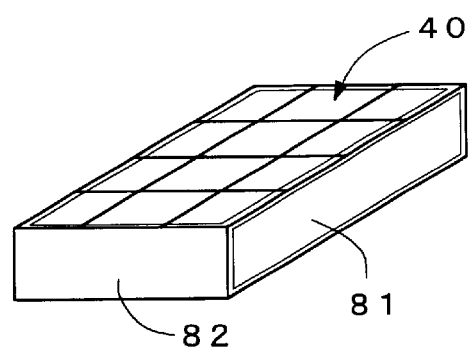
FIG. 17
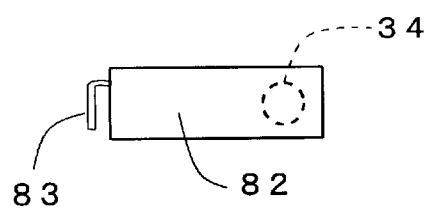
FIG. 18

LED ILLUMINATING DEVICE AND LIGHTING APPARATUS EMPLOYING THE SAME

BACKGROUND OF THE INVENTION

1. Field of the Invention

The present invention relates to an LED illuminating device employing an LED element comprising at least one diode as its light source to produce a wide area of emitted light. The present invention further relates to lighting apparatus employing the LED illuminating device as a light source.

2. Description of the Related Art

To date, numerous light sources using electric power to emit light have been developed with practical applications. In general though, light from these sources has a small area of illumination. In order to achieve effective illumination within a desired area, therefore, these light sources must employ a means for reflecting or diffusing light, such as a reflecting plate, or be used together with a condenser lens or diffusion lens.

By their nature, LEDs (light-emitting diodes) emit light through a light-emission surface without diffusion. In other words, they can emit what are known as parallel light beams. Conventionally, LEDs have primarily been used for indicators or pilot lamps, wherein the light of the LED itself conveys a meaning.

As described in Japanese unexamined patent application publication No. H9-163080, LEDs can also notably be incorporated in light sources for reading facsimile originals or for erasing latent images from photoconductor drums in plain-paper copiers. These light-source devices, well known in the art, are configured of a cylindrical transparent member. The transparent member is provided on one end with a light reader for reading light from an LED and on the other end with a reflecting surface. Lenses are formed in the transparent member by cutting isosceles-triangle shapes in the member with a knurling tool.

However, the light-source devices described in the above publication produce a line-shaped light that is wide along a prescribed direction and narrow in the direction orthogonal to the first direction. Accordingly, these devices are restricted to special uses, such as scanning facsimile originals, and are not appropriate for application in ordinary lamps that must illuminate large areas.

Several methods have been proposed to improve LEDs as a light source for illumination. For example, the published Japanese translation of PCT international publication for patent application No. WO98/13709 describes an illuminating device provided with a flat transparent plate having a plurality of protrusions on its surface and a plurality of point-light sources opposing the opposite surface of the plate. Light irradiated from the point-light sources passes through the transparent plate and is diffracted by the protruding portions as the light is irradiated externally.

However, because the light in devices described in this publication is diffracted and diffused when passing through the transparent member, the amount of light from an already weak LED light source is further reduced, making it difficult to sufficiently illuminate the target.

SUMMARY OF THE INVENTION

According to the present invention, there is provided an LED illuminating device which includes a rod-shaped light-guiding member consisting of a translucent material; and an LED element having at least one light emitting diode and disposed at an end of said light-guiding member for emitting lights into said light-guiding member in the longitudinal direction; characterized in that said light-guiding member has a plurality of grooves formed therein arranged along the axial direction of said light-guiding member with a desired distance therebetween for reflecting the lights from said LED element to outside of said light-guiding member.

Preferably, the grooves are disposed only in a desired area adjacent to the end at which the LED element is disposed. Alternately, the grooves are disposed in a desired appropriate interval between adjacent ones, and extending in a direction intersecting an optical axis of the light formed in the light-guiding member at a desired angle.

The grooves may comprise a first group extending along a direction intersecting the optical axis at a first angle, and a second group extending along a direction intersecting the optical axis at a second angle. The distance between adjacent grooves disposed at the end of the light-guiding member at which the LED element is disposed may be larger than that between the adjacent grooves disposed away from the groove pair.

In a preferable aspect of the present invention, the light-guiding member has a configuration of a cylindrical column, part of which is cut-out along a plane intersecting the light axis to form a flat surface and a curved surface opposing the flat surface of the light reflecting section, and wherein the grooves are formed in the planer surface with an appropriate intervals along the longitudinal direction of the light-guiding member and have a reflecting surface for directing the light from the LED element toward the curved surface of the light-guiding member.

The configuration of the cross-section of the light-guiding member may preferably be a combination of part of a circle and a linear line connecting both ends of the circle. Each of the grooves can have a reflecting surface at the bottom thereof for reflecting the light from the LED element to the round surface of the light-guiding member.

The present invention also provides an LED illuminating appliance in the form of a streetlight comprising an illuminating unit including the LED illuminating device to function as a streetlight, which comprises a support post, an illuminating unit supported by the support post, wherein the illuminating unit comprises a housing accommodating a plurality of the LED illuminating devices in parallel with each other, a translucent covering forming a floodlight portion at the front side of the housing, an electric-power source enclosed in the housing for driving the LED illuminating devices.

One of preferable electric power supplying devices is a storage battery and a solar battery panel attached to the pole for supplying electric power to the storage battery, thereby to supply electric power from the storage battery to the LED illuminating devices. Alternatively, the electric power-supplying device comprises a wind power generator attached to the pole and a storage battery for storing electric power from the wind power generator, thereby to supply electric power from the storage battery to the LED illuminating devices.

In another aspect of the present invention, there is provided an LED illuminating appliance in the form of a streetlight comprising an illuminating unit including the LED illuminating device, which comprises an illuminating unit formed as a signboard and a pole for supporting the illuminating unit, wherein the illuminating unit comprises a housing for accommodating a plurality of the LED illuminating devices arranged in parallel with each other, a translucent covering disposed in the front portion of the housing through which light from the LED illuminating devices is directed outside, a storage battery, and a solar cell panel for supplying electric power to the storage battery.

In a further aspect of the present invention, there is provided an LED illuminating appliance in the form of a streetlight comprising an illuminating unit including said LED illuminating device, which comprises an illuminating unit formed as a porch light, wherein said illuminating unit comprises a housing for accommodating a plurality of said LED illuminating devices arranged in parallel with each other, a translucent covering disposed in the front portion of said housing through which the lights from said LED illuminating devices are directed outside and a switch means that is turned on by a signal from a light-receiving element so as to supply electric power to LED illuminating devices when the ambient luminous intensity becomes lower than a predetermined value.

Another LED illuminating appliance according to the present invention can be in the form of a streetlight comprising an illuminating unit including the LED illuminating device, which comprises an illuminating unit comprising a parallel piped casing for accommodating a plurality of the LED illuminating devices arranged in parallel with each other, a translucent covering disposed in the front portion of the housing through which the lights from the LED illuminating devices are directed outside, and a solar cell panel disposed on the upper surface of the housing; and which further comprises a storage battery and a solar cell panel for supplying electric power to the storage battery housed in the housing.

According to the present invention, there also is provided an LED illuminating appliance in the form of a streetlight comprising an illuminating unit including the LED illuminating device, which comprises a cylindrical translucent covering, a cylindrical reflector having a diameter smaller than that of the covering and enclosed therein in a coaxially manner, a plurality of the LED illuminating devices disposed between the covering and the reflector in such manner that the axes of the LED illuminating devices are arranged in a cylindrical plane having a common axis with the reflector and in parallel with each other.

The features and advantages of the present invention will be understood from the following detailed description with reference to the accompanying drawings.

BRIEF DESCRIPTION OF THE DRAWINGS

FIG. 1 is a perspective view showing an LED illuminating device according to a first embodiment of the present invention;

FIG. 2 is a side view of the LED illuminating device in FIG. 1;

FIG. 3(A) is a transverse cross-sectional view of a light guiding member in the LED illuminating device of FIG. 1;

FIG. 3(B) is a cross-sectional view along the line A–A' in FIG. 3(A);

FIG. 4 is a partial side view showing an LED illuminating device according to a second embodiment of the present invention;

FIG. 5(A) is a partial plan view showing the grooved surface of a light-guiding member in the LED illuminating device according to a third embodiment;

FIG. 5(B) is a cross-sectional view along the line B–B' in FIG. 5(A);

FIG. 6 is a partial plan view showing the grooved surface of a light-guiding member in the LED illuminating device according to a fourth embodiment;

FIG. 7 is a perspective view showing the LED illuminating device according to a fifth embodiment;

FIG. 8 is a plan view showing the flat, sloped surface of the light-guiding member in the LED illuminating device of FIG. 7;

FIG. 9 is an enlarged side view showing a portion of the light-guiding member in the LED illuminating device of FIG. 7;

FIG. 9(A) is an explanatory diagram showing an enlarged groove formed in the light-guiding member of FIG. 9;

FIG. 9(B) is a cross-sectional view along the line C–C' in FIG. 9;

FIG. 9(C) is a cross-sectional view along the line D–D' in FIG. 9;

FIG. 9(D) is an enlarged side view showing a portion of the light-guiding member according to a variation of the LED illuminating device in FIG. 9;

FIG. 9(E) is an explanatory diagram showing an enlarged groove formed in the light-guiding member of FIG. 9(D);

FIG. 14(A) is an explanatory diagram showing an example layout of LED illuminating devices in the lighting apparatus of FIG. 13;

FIG. 14(B) is an explanatory diagram showing another example layout of LED illuminating devices in the lighting apparatus of FIG. 13;

FIG. 15 is a front view showing a lighting apparatus according to a tenth embodiment and an entrance door illuminated thereby;

FIG. 16 is a perspective view showing the lighting apparatus of FIG. 15;

FIG. 17 is a perspective view showing the lighting apparatus embodying the present invention;

FIG. 18 is a side view showing the lighting apparatus of FIG. 17;

DESCRIPTION OF THE PREFERRED EMBODIMENTS

Figure 10:
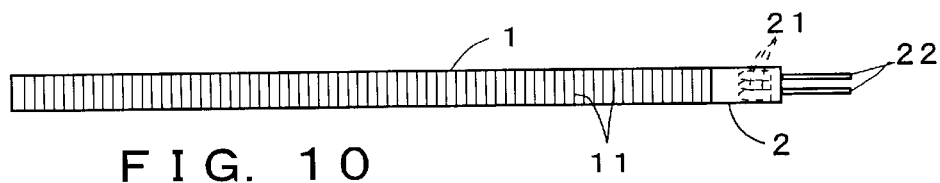
FIG. 10 is a side view similar to FIG. 8 showing the LED illuminating device according to a sixth embodiment.

An LED illuminating device and lighting apparatus employing this device according to preferred embodiments of the present invention will be described while referring to the accompanying drawings. FIG. 1 shows the LED illuminating device according to a first embodiment of the present invention.

As shown in FIG. 1, an LED illuminating device 10 comprises a cylindrical light-guiding member 1 and LEDs 2 provided one in contact with each end surface of the light-guiding member 1. The LEDs 2 are normal LEDs molded from a transparent resin. Two terminals, or lead wires 12, extend externally from the light-emitting diode. The optical axis of light emitted from each LED 2 is aligned with the central axis of the light-guiding member 1. A support member (not shown) fixes the LEDs 2 in position.

Any desired type of LED can be used, including a gallium-phosphorus (GaP) green/red LED and gallium-arsenic-phosphorus ($GaAs_xP_{1-x}$) red LED. However, the LEDs 2 used in the present embodiment are ultrabright white LEDs, each with a diameter of 5 mm.

As shown in FIG. 2, the light-guiding member 1 has a columnar shape and is formed of a synthetic resin having good translucence, such as a hard acrylic resin. A plurality of grooves 11 are formed in the surface of the light-guiding member 1 in a region of appropriate length beginning from an end face of the light-guiding member 1. The end face opposing the LED 2 should be finished as smoothly as possible in order to prevent the irregular reflection or diffraction of light off this surface. As shown in FIGS. 3(A) and 3(B), the grooves 11 extend about halfway around the peripheral surface of the light-guiding member 1 in a plane perpendicular to the axis of the light-guiding member 1. Such grooves can easily be formed by a laser beam process.

The interval between neighboring grooves 11 can be set at a fixed length in the axial direction of the light-guiding member 1. However, it is desirable to set a wider interval between grooves 11 on the ends of the light-guiding member 1, that is, near the LEDs 2, and to gradually narrow the intervals going away from the LEDs 2. The length of each groove 11 around the periphery of the light-guiding member 1 is also set longest on the ends of the light-guiding member 1, that is, the ends nearest each LED 2, and is gradually shorter going away from each LED 2.

With this construction, a direct current is supplied to each LED 2, causing light to be emitted from the LEDs 2. The light proceeds toward the opposing end face, but a portion of the light contacts the side surfaces of the grooves 11, diffracts, and emits outside the light-guiding member 1. By forming the grooves 11 across a range of prescribed length along the lengthwise direction of the light-guiding member 1, light is emitted outside the light-guiding member 1 through the plurality of grooves 11 formed within this area. By setting the interval between neighboring grooves 11 wider near the LEDs 2 and gradually narrower going away from the LEDs 2, light diffraction caused by the grooves 11 is less in positions having a large amount of light. However, the number of grooves 11 increases away from the LEDs 2 where the amount of light decreases, thereby achieving a uniform illumination along the entire length of the light-guiding member 1.

In the embodiment described above, the grooves 11 are formed at a length encircling approximately one-half of the circumference of the light-guiding member 1. Accordingly, about one-half of the 360-degree region around the axis of the light-guiding member 1 is illuminated by light emitted from the light-guiding member 1. However, the grooves 11 can also be formed annularly around the entire circumference of the light-guiding member 1, thereby emitting light in all directions.

FIG. 4 shows an LED illuminating device according to a second embodiment of the present invention. In this example, the LED 2 is provided only on one end of the light-guiding member 1. The grooves 11 formed on the peripheral surface of the light-guiding member 1 are provided within an appropriate range on the same end as the LED 2. A LED illuminating device 10 of this construction is suitable for applications requiring a relatively small lighting area.

FIG. 5(A) shows the light-guiding member 1 used in an LED illuminating device according to a third embodiment of the present invention. In the third embodiment, the light-guiding member 1 is a column-shaped member having good translucence. A plurality of grooves 11 is formed in the surface of the light-guiding member 1 covering approximately one-half of the periphery thereof.

The light-guiding member 1 shown in FIG. 5(A) differs from the light-guiding member 1 in the examples of FIG. 1 through FIG. 4 in that parallel lines Y running lengthwise along each groove 11 intersect an optical axis X parallel to the center axis of the light-guiding member 1 at an appropriate angle greater than 0° and less than 90°. The angle of intersection α is arbitrarily selected according to the optical properties of the light-guiding member 1 or conditions of the LED 2, such as amount of light emission, wavelength, and the like, and also according to the intended application of the LED illuminating device. However, it is desirable that the angle α is set within the range 10–80° and preferably within 30–60°. In the example shown in FIG. 5(A), the angle α is selected at about 45°.

While the grooves 11 provided in the light-guiding member 1 can all be oriented in the same direction, as shown in FIG. 5(A), FIG. 6 illustrates another configuration according to a fourth embodiment. In this example, the light-guiding member 1 is provided with a plurality of first grooves 11-1 formed parallel to one another at a first angle, and a plurality of second grooves 11-2 parallel to each other and intersecting the first grooves 11-1 at a desirable angle. As a result, the grooves form a plurality of diamond-shaped protrusions in the surface of the light-guiding member 1.

Next, an LED illuminating device according to a fifth embodiment of the present invention will be described with reference to FIGS. 7 and 8. Because the components of this LED illuminating device are basically the same as those in FIG. 1, like parts and components are designated by the same reference numerals so as to avoid duplicating description.

As shown in FIG. 8, the light-guiding member 1 is cylindrical in shape and formed of a synthetic resin having good translucence, such as a hard acrylic resin. The light-guiding member 1 is cut with a flat surface that tapers at a relatively gradual angle in the direction that light emits from the LED 2. A plurality of grooves 11 is formed in this tapered surface, the grooves 11 extending in a direction orthogonal to the optical axis. As a result, the cross-section of the light-guiding member 1 is circular in shape on one end and Quonset-shaped on the other. The LED 2 is provided only on the end of the light-guiding member 1 having the largest cross-sectional surface area.

FIG. 9 graphically depicts how the grooves 11 direct light from the LED 2 out of the light-guiding member 1. For purposes of illustration, the angle of the flat surface formed on the grooves 11 in relation to the axis of the light-guiding member 1 has been exaggerated.

As shown in FIGS. 9(A), 9(B), and 9(C), a side surface 11a of the groove 11 nearest the LED 2 is inclined to intersect with the optical axis of the LED 2 at an appropriate angle, for example, 45° or thereabout. The inclined surface 11a functions as a reflecting surface for reflecting light emitted from the LED 2 in a direction different from the emitted direction of the light. Therefore the surface 11a should be finished as smoothly as possible.

FIGS. 9(D) and 9(E) show a variation of the grooves 11 formed in the light-guiding member 1. As shown in FIG. 9(E), the cross-sectional surface of each groove 11 includes approximately parallel side surfaces opposing each other at an appropriate distance and a bottom surface 11a inclined at an angle of approximately 45° in relation to the direction that light travels from the LED 2. The bottom surface 11a functions as a reflecting surface for reflecting light emitted from the LED 2 in a direction different from the emitted direction of the light.

The various shapes of grooves described above can easily be formed using a laser beam process, injection molding, or other popular technique.

In each embodiment described above, the interval between neighboring grooves 11 can be set at a fixed distance along the length of the light-guiding member 1 or at varying distances. When varying the distance, the intervals can be set gradually smaller away from the side nearest the LED 2 and toward the opposing end. This configuration is effective for minimizing differences in illumination obtained along the length of the light-guiding member 1.

When a direct current is supplied to the LED 2 in an LED illuminating device of this construction, light is emitted from the LED 2. The emitted light enters the light-guiding member 1 via the end face thereof and travels toward the opposing end. At this time, a portion of the light strikes and reflects off the reflecting surfaces 11a on the bottom of the grooves 11 and is emitted out of the light-guiding member 1 via the curved surface of the light-emitting portion. Here, the light-emitting portion comprises an area of appropriate length along the light-guiding member 1 in which the grooves 11 are formed. Because the grooves 11 are formed within a range of appropriate length along the light-guiding member 1, light reflected off the plurality of reflecting surfaces 11a is emitted out through this light-emitting portion.

The cross-sectional configuration, depth, width of the grooves, and the interval therebetween are factors for determining the distribution of the intensity of illumination along the lengthwise direction of the LED illuminating device according to the present invention. The optimum factors can easily be found out by simple experiments. For the structure shown in FIGS. 7 to 9(E), if the grooves have same size and same configuration, a uniform illumination is obtained across the entire length of the light-guiding member 1.

Next, FIG. 10 shows an LED illuminating device according to a sixth embodiment of the present invention. In this embodiment, an LED element 2 accommodating a plurality of the LED devices 21 in a casing is used. The numeral 22 shows a pair of leads fixed to the casing and connected in common to the respective electrodes of the LED devices 21. The amount of light emitted from the LED illuminating device is a multiple of the number of LEDs 21 used in the device. This LED illuminating device of this embodiment has such applications as lighting for road signs for instructing drivers at a distance.

Next, a variety of lighting apparatuses configured using the LED illuminating device embodying the present invention will be described. Because the illuminating device of the present invention employees LEDs as the light source, the device does not generate heat when lit. Accordingly, the LED illuminating device is appropriate for use as a light source in a refrigerator or freezer. Moreover, the LED illuminating device consumes less power than do other light sources, such as incandescent lamps and fluorescent lamps, and it has a long lifespan. Hence, the LED illuminating device of the present invention can be useful as a light that must be constantly illuminated, such as a marker lamp.

Figure 11:
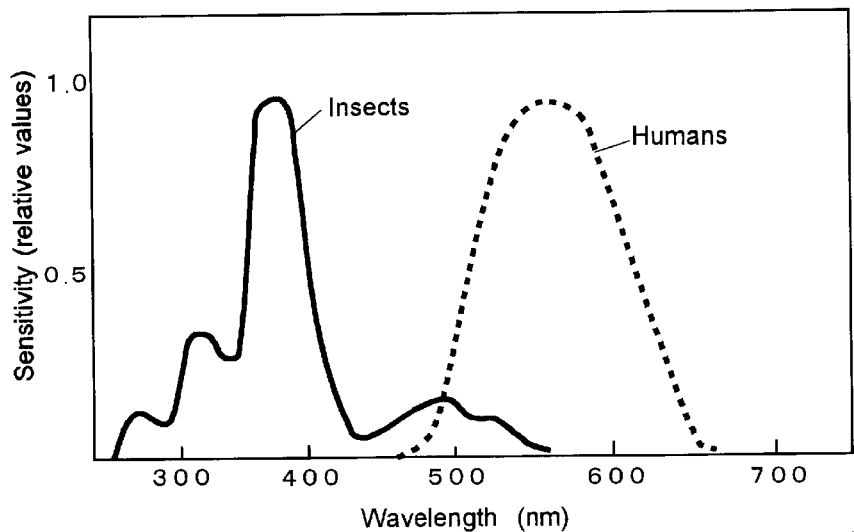
FIG. 11 is a graph showing changes in sensitivity to wavelengths for the eyes of the humans and insects.

Although the color emission from LEDs can be changed according to the variety of elements or compounds used to configure the semiconductors, it is not possible to generate a light of an extremely short wavelength, shorter than the limit of human visibility, which is approximately 400 nm. FIG. 11 is a graph showing the range of visible wavelengths for humans and insects. From the graph it is clear that LEDs, which generate a light only in the range of human visibility, is invisible to insects. Accordingly, LEDs can be used constantly outdoors without attracting insects.

The following Table 1 gives data for various types of light that are visible to insects. This table shows the capacity of these lights to attract insects.

TABLE 1

VISIBLE ATTRACTION TO INSECTS

| Insect Attraction (for incandescent lamps) | Light Source (based on 100 points of attraction) |
| --- | --- |
| Low-pressure sodium lamp | 4 |
| Yellow fluorescent lamp | 8 |
| High-pressure sodium lamp | 35 |
| Insect-repelling fluorescent lamp | 49 |
| Incandescent lamp | 100 |
| White fluorescent lamp | 113 |
| Metal halide lamp | 135 |
| Natural white fluorescent lamp | 158 |
| High-pressure mercury vapor lamp | 260 |
| Fluorescent lamp for insect traps | 1,300 |

Unlike the normal light sources described above, LEDs have almost zero attraction to insects. Therefore, LEDs are suitable as outdoor lighting apparatuses because they can be lit constantly outdoors without attracting insects.

Below are several examples of lighting apparatus configured of the LED illuminating device of the present invention for various applications.

Figure 12:
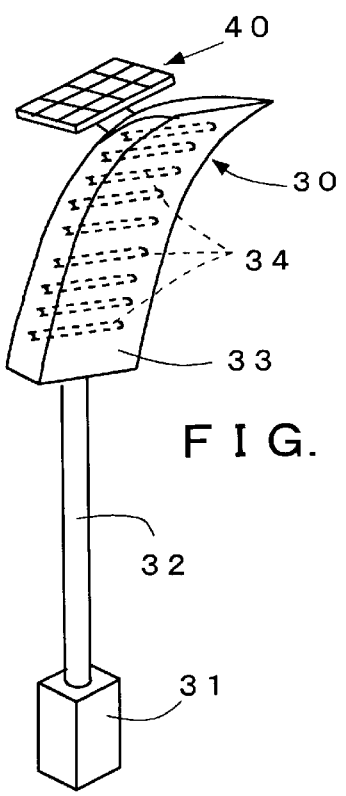
FIG. 12 is a perspective view showing a lighting apparatus according to a seventh embodiment.

FIG. 12 shows a lighting apparatus according to a seventh embodiment of the present invention configured for use as a streetlight. The lighting apparatus of the seventh embodiment comprises a base unit 31, a post 32 fixed to the base unit 31, and an illuminating unit 30 mounted on top of the post 32. The illuminating unit 30 is shaped like an elongated box formed with a slight bend. A light-permeable cover 33 is attached to the front surface of the illuminating unit 30. A plurality of LED illuminating devices 34 is accommodated on the inner side of the cover 33. Each LED illuminating device 34 is configured of a light-guiding member and an LED provided on one or both ends of the light-guiding member, as in the examples of FIG. 2, FIG. 4, FIG. 7, or FIG. 10. It is also desirable to mount a reflecting plate on the back surface of the LED illuminating devices 34.

A solar cell panel 40 is mounted on the back surface of the illuminating unit 30 with its light-receiving surface angled to receive sunlight. Further, an accumulator battery (not shown) is accommodated in the base unit 31. Output from the solar cell panel 40 charges this accumulator battery. When the light switch is set to ON at nighttime, perhaps when a photodetector (not shown) detects that the surrounding area has darkened, the accumulator battery supplies electric current to the LED illuminating devices 34 in the cover 33, causing light to emit from the LEDs.

Figure 13:
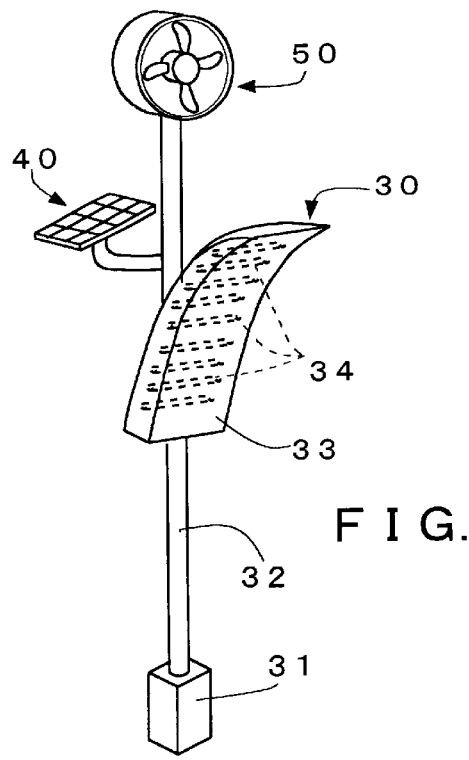
FIG. 13 is a perspective view showing a lighting apparatus according to an eighth embodiment.

In the eighth embodiment of the present invention, shown in FIG. 13, the post 32 extends above the illuminating unit 30. A wind power generator 50 is mounted on top of the post 32. Output from the wind power generator 50 is combined with output from the solar cell panel 40 to charge the accumulator battery (not shown) housed in the base unit 31, as described in FIG. 12. With a lighting apparatus of this construction, the wind power generator 50 can generate electricity at night, providing there is wind, when the solar cell panel 40 cannot operate, thereby lengthening the discharge time of the accumulator battery. Of course, it is also possible to mount the wind power generator 50 as an independent power generating source.

Figure 14:
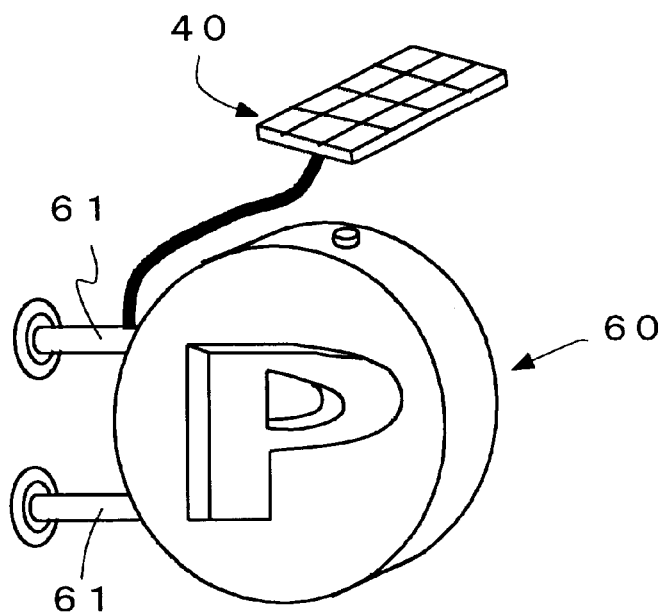
FIG. 14 is a perspective view showing a lighting apparatus according to a ninth embodiment.
Figure 14:
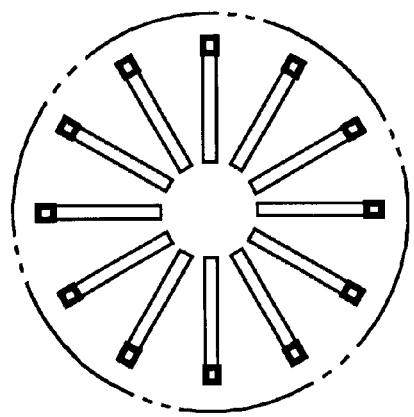
Figure 14:
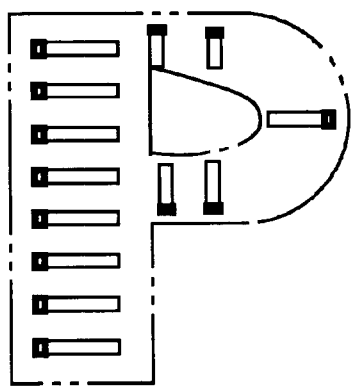

In the ninth embodiment of the present invention, shown in FIG. 14, a signboard 60 has an arbitrary shape and an arbitrary display pattern. The signboard 60 is fixed to the wall of a building or the like by support rods 61. The LED illuminating devices (not shown), such as those shown in FIG. 2, FIG. 4, FIG. 7, or FIG. 10, are accommodated in the signboard 60. A solar cell panel 40 is disposed in an appropriate location for receiving sunlight and outputs power to be stored in a rechargeable battery (not shown). The LED illuminating devices are driven by the power stored in this rechargeable battery.

When the target to be illuminated by the LED illuminating device is circular, as in the lighting apparatus of FIG. 14, it may be desirable to arrange the LED illuminating devices in a radial layout, as shown in FIG. 14(A), rather than arranging the LED illuminating devices parallel to one another in a rectangular space, as in the examples of FIG. 12 and FIG. 13. Alternatively, an unorthodox layout, such as that shown in FIG. 14(B), can be employed to form a special pattern displayed by the signboard 60, such as the character P in this example.

FIG. 15 shows the lighting apparatus of the present invention applied to the porch light of a residence in a tenth embodiment of the present invention. A front door 71 has a doorknob 72. An illuminating unit 70 is provided in a porch light mounted on the wall to the side of the doorknob 72. The porch light includes a nameplate 73. As shown in FIG. 16, the illuminating unit 70 includes a Quonset-shaped translucent cover 74 and a plurality of LED illuminating devices 34 provided parallel to one another in the space covered by the cover 74. The illuminating unit 70 is capable of illuminating the nameplate 73 therebelow and the nearby doorknob 72. A photodetector 8 is disposed on the front surface of the illuminating unit 70 for detecting the surrounding brightness. When the surrounding area darkens, a switch is turned ON to light the LED illuminating devices 34.

A further type of lighting apparatus embodying the present invention shown in FIGS. 17 and 18 comprises a rectangular parallelepiped case 82. The front surface of the case 82 is composed of a translucent cover 81. A solar cell panel 40 is mounted on the top surface of the case 82. The case 82 accommodates an LED illuminating device 34, an accumulator battery (not shown) for accumulating electric power received from the solar cell panel 40, a power source (also not shown) for driving the accumulator battery, and the like. When necessary, a hook 83 is provided on the back surface of the case 82 for attaching the case 82 to a wall or the user's waist belt.

The lighting apparatus in the above example is easy to construct and can be made compact. The device is appropriate for temporary attachment to desired positions when lighting is required. The hook 83 can be replaced by a clip, cord, or other connector or fastener.

Figure 19:
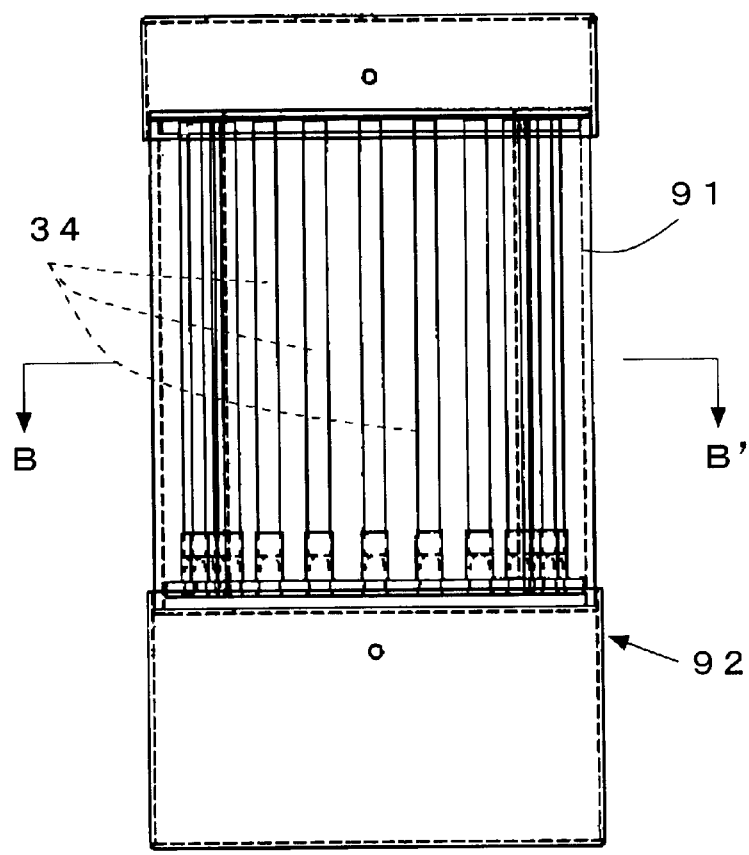
FIG. 19 is a perspective view showing an eleventh embodiment of the lighting apparatus according to the present invention.
Figure 20:
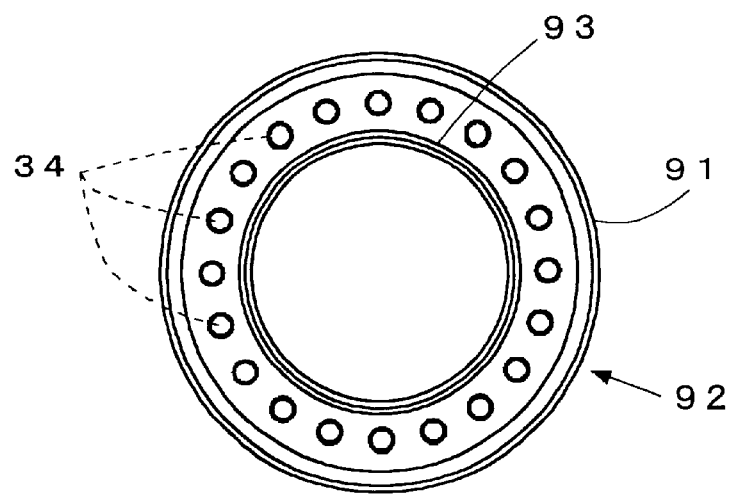
FIG. 20 is a cross-sectional view along the line B–B' in FIG. 19.

FIGS. 19 and 20 show another lighting apparatus according to the present invention. This apparatus includes a cylindrical housing 92, a cylindrical cover 91 provided in the center of the housing 92 and formed of a translucent material, and a cylindrical reflecting plate 93 arranged concentric to the cover 91 inside the housing 92. A plurality of LED illuminating devices 34 are disposed between the reflecting plate 93 and cover 91 along a circle concentric to the same.

A lighting apparatus of this construction emits both direct light from the LED illuminating devices 34 and reflected light from the reflecting plate 93 from the housing 92 in all directions.

As described above, these lighting apparatuses are suitable for outdoor lighting applications, such as signboards and street signs, because LED lights have almost no capacity to attract insects. Because there is no need to replace light bulbs in these lighting apparatus, maintenance after installation is not necessary. By combining these apparatus with a solar panel, it is possible to eliminate the need for a source of electric power, making the apparatus environmentally friendly for its power-saving capacity. Further, the apparatus can be used for lighting forest roads and other locations in which a public power source is unavailable.

The lighting apparatus of the present invention can be embedded in counters at eating and drinking establishments, for example, for display use. Because bulb replacement is unnecessary, these apparatuses can be embedded anywhere and can employ a combination of red, green, blue, and other colors. Other applications include footlights in facilities, guiding lights for stairways, emergency lights, and the like, because the lighting can last a long time on a backup power source in the case of a power outage or the like. These apparatuses can be embedded in buildings and the like, because of their long lifespan and lack of maintenance requirements.

The present invention can also be applied to the following applications not illustrated in the drawings. Because the LED illuminating device of the present invention generates almost no heat, these devices can be used as the lighting source in refrigerators and freezers. The LED illuminating device does not dim in colder temperatures, as do cold-cathode tubes.

Another application is desk lamps for studying and the like. Without the flickering inherent in fluorescent bulbs, these LED devices are easy on the eyes and do not contribute to nearsightedness.

By taking advantage of its lightweight, compact features, the LED illuminating device can be incorporated in diving equipment and used for alerting lights when diving or jogging at night.

Although the invention has been described in detail with reference to specific embodiments thereof, it would be apparent to those skilled in the art that many modifications and variations can be made therein without departing from the spirit of the invention, the scope of which is defined by the attached claims.

What is claimed is:

1. An LED illuminating device for emitting parallel light rays, said device comprising a rod-shaped light-guiding member made of a translucent material, and an LED element for emitting parallel light rays, with said element having at least one light-emitting diode and being disposed at an end of said light-guiding member, for emitting light rays into said light-guiding member in the longitudinal direction;

said light-guiding member has a plurality of grooves formed therein and arranged along the axial direction of said light-guiding member, and at a desired distance therebetween for reflecting the lights from said LED element for emitting parallel light rays to the outside of said light-guiding member.

2. An LED illuminating device for emitting parallel light rays, as set forth in claim 1, wherein said grooves are disposed only within a range of appropriate length beginning from said end at which the LED element for emitting parallel light rays is disposed.

3. An LED illuminating device for emitting parallel light rays, as set forth in claim 1, wherein said grooves are disposed parallel to each other at appropriate intervals, and extended in a direction so as to intersect at an appropriate angle a light axis of the light formed in said light-guiding member.

4. An LED illuminating device for emitting parallel light rays, as set forth in claim 3, wherein said grooves comprise a first group extending along a direction intersecting said light axis at a first angle, and a second group extending along a direction intersecting the light axis at a second angle.

5. An LED illuminating device for emitting parallel light rays, as set forth in claim 1, wherein the interval between neighboring grooves is largest near the end at which said LED element for emitting parallel light rays is disposed and grows smaller further away from the end at which said LED element for emitting parallel light rays is disposed.

6. An LED illuminating device for emitting parallel light rays, as set forth in claim 1, wherein said light-guiding member has a configuration of a cylindrical column, part of which is cut-out along a plane intersecting said light axis so as to form a flat surface and a curved surface opposing the flat surface of the light-reflecting section, and wherein said grooves are formed in said planer surface at appropriate intervals along the longitudinal direction of said light-guiding member and have a reflective surface for directing the light from said LED element for emitting parallel light rays toward said curved surface of said light-guiding member.

7. An LED illuminating device for emitting parallel light rays, as set forth in claim 6, wherein the cross-section of the light guide member includes both a curved surface and a flat surface.

8. An LED illuminating device for emitting parallel light rays, as described in claim 6, wherein each of said grooves has a reflective surface at its bottom for reflecting light from said LED element for emitting parallel light rays to the outside through said round surface of said light-guiding member.

9. An LED illuminating appliance for emitting parallel light rays in the form of a streetlight comprising an illuminating unit that includes said LED illuminating device for emitting parallel light rays as described in claim 1 so as to function as a streetlight, which comprises a pole, an illuminating unit supported by said pole, wherein said illuminating unit comprises a housing accommodating a plurality of said LED illuminating devices for emitting parallel light rays in parallel with each other, a translucent covering forming a floodlight portion at the front side of said housing, an electric-power source enclosed in said housing for powering said LED illuminating devices for emitting parallel light rays.

10. An LED illuminating appliance for emitting parallel light rays, as described in claim 7, wherein said electric-power supplying device comprises a solar-battery panel attached to said pole, and a storage battery for storing electric power from said solar-battery panel, thereby to supply an electric power from said storage battery to said LED illuminating devices.

11. An LED illuminating appliance for emitting parallel light rays, as described in claim 7, wherein said electric-power supplying device further comprises a wind-power generator attached to said pole and a storage battery for storing electric power from said wind-power generator, thereby to supply electric power from said storage battery to said LED illuminating devices.

12. An LED illuminating appliance for emitting parallel light rays, in the form of a streetlight comprising an illuminating unit that includes said LED illuminating device for emitting parallel light rays as described in claim 1, which comprises an illuminating unit formed as a signboard, wherein said illuminating unit comprises a housing for accommodating a plurality of said LED illuminating devices, arranged in parallel with each other, for emitting parallel light rays, a translucent covering disposed in the front portion of said housing, through which light from said LED illuminating devices for emitting parallel light rays is led outside, a storage battery and a solar-battery panel for supplying electric power to said storage battery.

13. An LED illuminating appliance for emitting parallel light rays, in the form of a streetlight comprising an illuminating unit that includes said LED illuminating device for emitting parallel light rays, as described in claim 1, with said device comprising an illuminating unit formed as a porch light, wherein said illuminating unit comprises a housing for accommodating a plurality of said LED illuminating devices, arranged in parallel with each other, for emitting parallel light rays, a translucent covering disposed in the front portion of said housing, through which light from said LED illuminating devices for emitting parallel light rays is led outside and a switch that is turned on by a signal from a light-receiving element so as to supply electric power to said LED illuminating devices for emitting parallel light rays when the ambient luminous intensity becomes lower than a predetermined value.

14. An LED illuminating appliance for emitting parallel light rays, in the form of a streetlight comprising an illuminating unit that includes said LED illuminating device for emitting parallel light rays, as described in claim 1, with said device comprising an illuminating unit comprising a parallel piped casing for accommodating a plurality of said LED illuminating devices, arranged in parallel with each other, for emitting parallel light rays, a translucent covering disposed in the front portion of said housing through which the light from said LED illuminating devices for emitting parallel light rays is led outside, and a solar-battery panel disposed on an upper surface of said housing; and with said device further comprising a storage battery and a solar-battery panel for supplying electric power to said storage battery housed in said housing.

15. An LED illuminating appliance for emitting parallel light rays, in the form of a streetlight comprising an illuminating unit that includes said LED illuminating device for emitting parallel light rays, as described in claim 1, with said device comprising, in a housing, an LED illuminating device for emitting parallel light rays, a power source that drives said LED illuminating device for emitting parallel light rays, a cylindrical translucent covering, a cylindrical reflector having a smaller diameter than that of said covering and enclosed therein in a coaxial manner, a plurality of said LED illuminating devices for emitting parallel light rays, disposed between said covering and said reflector in such manner that the axes of said LED illuminating devices for emitting parallel light rays are arranged in a cylindrical plane having a common axis with said reflector and in parallel with each other.

* * * * *

UNITED STATES PATENT AND TRADEMARK OFFICE
CERTIFICATE OF CORRECTION

PATENT NO.     : 6,601,984 B2
DATED          : February 12, 2002
INVENTOR(S)    : Yutaka Yamamoto et al.

It is certified that error appears in the above-identified patent and that said Letters Patent is hereby corrected as shown below:

Title page,
Item [30], Foreign Application Priority Data, should appear as:
-- [30] Foreign Application Priority Data
    Jan. 16, 2002 (JP) ............. 2002-000148U --

Signed and Sealed this

Thirteenth Day of July, 2004

JON W. DUDAS
*Acting Director of the United States Patent and Trademark Office*